(12) United States Patent
Giessel et al.

(10) Patent No.: US 10,516,147 B2
(45) Date of Patent: Dec. 24, 2019

(54) BATTERY PACK WITH REDUCED MAGNETIC FIELD EMISSION

(71) Applicant: 9013733 CANADA INC., Waterloo (CA)

(72) Inventors: David Giessel, Waterloo (CA); Bruce Hildesheim, Kitchener (CA)

(73) Assignee: 9013733 CANADA INC. (CA)

( * ) Notice: Subject to any disclaimer, the term of this patent is extended or adjusted under 35 U.S.C. 154(b) by 246 days.

(21) Appl. No.: 15/676,986

(22) Filed: Aug. 14, 2017

(65) Prior Publication Data

US 2018/0212217 A1 Jul. 26, 2018

Related U.S. Application Data

(60) Provisional application No. 62/449,727, filed on Jan. 24, 2017.

(51) Int. Cl.
| | |
|---|---|
| *H01M 2/10* | (2006.01) |
| *H01B 1/02* | (2006.01) |
| *H01M 2/20* | (2006.01) |
| *H01B 3/18* | (2006.01) |

(52) U.S. Cl.
CPC .......... *H01M 2/1094* (2013.01); *H01B 1/026* (2013.01); *H01B 3/18* (2013.01); *H01M 2/105* (2013.01); *H01M 2/1072* (2013.01); *H01M 2/1077* (2013.01); *H01M 2/204* (2013.01); *H01M 2220/20* (2013.01); *H01M 2220/30* (2013.01)

(58) Field of Classification Search
CPC ....... H01B 3/18; H01B 1/026; H01M 2/1094; H01M 2/204; H01M 2/105; H01M 2/1072; H01M 2220/30; H01M 2220/20
See application file for complete search history.

(56) References Cited

U.S. PATENT DOCUMENTS

| | | | |
|---|---|---|---|
| 8,642,205 B2 | 2/2014 | Maleki et al. | |
| 2011/0262779 A1 | 10/2011 | Maleki et al. | |
| 2011/0262787 A1 | 10/2011 | Maleki et al. | |
| 2012/0033845 A1* | 2/2012 | Maleki ................... | H01M 2/30 381/386 |

* cited by examiner

*Primary Examiner* — Eugenia Wang
(74) *Attorney, Agent, or Firm* — Asgaard Patent Services, LLC; F. Wayne Thompson, Jr.

(57) ABSTRACT

Implementations of a battery pack with reduced magnetic field emission are provided. In some implementations, the battery pack may be configured to reduce and/or eliminate the magnetic field normally generated while electrical current is being drawn from one or more cylindrical-steel electrochemical cells (e.g., AA batteries) by a connected electrical device. In some implementations, each electrochemical cell of a battery pack may include a conductive sleeve comprised of four conductive strips that are separated from the electrochemical cell by a thin insulating layer of material. In this way, the conductive sleeve provides a return path for electrical current that minimizes the loop area between the electrochemical cell and the conductive sleeve thereof. In some implementations, the four conductive strips of a conductive sleeve may be equally spaced 90 degrees apart and/or positioned longitudinally on a cylindrical-steel electrochemical cell, separated therefrom by the insulating layer of material.

12 Claims, 6 Drawing Sheets

BATTERY PACK WITH REDUCED MAGNETIC FIELD EMISSION

CROSS REFERENCE TO RELATED APPLICATION

This application claims the benefit of U.S. patent application Ser. No. 62/449,727, which was filed on Jan. 24, 2017, and is incorporated herein by reference in its entirety.

TECHNICAL FIELD

This disclosure relates to implementations of a battery pack with reduced magnetic field emission.

BACKGROUND

In general, a magnetic field is generated when electrical current (or current) flows through a wire. Similarly, a magnetic field is generated when current is drawn from a battery by a connected device. If a wire having current flowing therethrough, or a battery having current drawn therefrom, is too close to a device that is sensitive to magnetic fields (e.g., an electronic compass-magnetometer), it will interfere with the proper function (e.g., orientation) of the device.

As an example, the magnetic fields generated by the flow of electrical current are a problem in the field of remotely piloted vehicles and unmanned aerial systems/drones (UAS). These devices rely heavily on an electronic compass (e.g., a magnetometer) that measures the magnetic field of the earth to determine flight direction. As such, reliable autonomous flight is not possible if the electronic compass is unable to work properly due to magnetic interference.

Since a strong magnetic field is generated by the battery and wiring of an unmanned aerial system during operation, their dependence on an electronic compass is a major safety issue. When the electronic compass experiences magnetic field interference, the UAS can experience what is known as a "fly away". In this condition, due to the electronic compass being unable to provide accurate direction references, the flight controller attempts to achieve a position in space as instructed by the operator, or other system, but the sensors of the UAS cause it to "fly away" in a random direction. For example, the flight control system may instruct a UAS to fly north. Instead, due to magnetic field interference, the UAS flies south. The "fly away" condition is dangerous because the operator is no longer in control of the UAS and is therefor unable to keep it within the confines of a designated safe operating area. Also, magnetic field interference is a leading cause of UAS crashes.

Lithium chemistry batteries come in two form factors: pouch cells and cylindrical cells. Pouch cells may comprise an anode, a cathode, and an electrolyte packaged in a polyethylene lined aluminum pouch. Cylindrical electrochemical cells may comprise an anode, a cathode, and an electrolyte sealed inside a steel cylinder.

New battery chemistries are most readily available in cylindrical cells (e.g., the 18650 format which is 18 mm in diameter and 65 mm in length) that are standardized and widely available. In general, there are no standardized pouch cells. Thus, obtaining pouch cells with new chemistry typically requires a high volume purchase, the cost of which makes using pouch cells impractical for many applications.

Cylindrical-steel electrochemical cells, as compared to pouch cells, are physically robust and offer better protection from environmental and operational damage. Cylindrical-steel electrochemical cells have low structural failure rates and are able to withstand the impact of a crash. This reduces the likelihood of a battery fire following the crash of a UAS. Unlike pouch cells, cylindrical electrochemical cells do not require special packaging techniques to extract maximum performance and battery life therefrom.

The primary challenge with utilizing cylindrical-steel electrochemical cells in UAS applications is the presence of iron in the steel cylinder. The iron is ferromagnetic and acts as a magnetic core within the current loop (i.e., the supply path and the return path for the electrical current), amplifying the magnetic field strength of the current loop thousands of times over an equivalent current loop having only non-ferrous material therein (e.g., an aluminum/polyethylene pouch cell).

As such, batteries built using cylindrical-steel cells generate large magnetic fields when current is flowing through them. This magnetic field can cause an electronic compass (e.g., a magnetometer) to malfunction if it is positioned near the power source (i.e., one or more cylindrical steel electrochemical cells) of an UAS, making the use of cylindrical-steel electrochemical cells impractical on small/compact UAS.

SUMMARY OF THE INVENTION

Implementations of a battery pack with reduced magnetic field emission are provided. In some implementations, the battery pack may be configured to reduce and/or eliminate the magnetic field normally generated while electrical current is being drawn from one or more cylindrical-steel electrochemical cells (e.g., AA batteries) by a connected electrical device. In some implementations, the magnetic field generated by the battery pack may be reduced by minimizing or eliminating the loop area of the electrical conductors (e.g., wires or other conductive elements) used to complete the supply path and the return path thereof. In some implementations, the supply path and the return path of a battery pack may be placed into a coaxial arrangement in which only a thin layer of insulating material is positioned therebetween. In this way, the loop area of the electrical conductors is minimized.

In some implementations, a battery pack may be comprised of six cylindrical-steel electrochemical cells (or batteries) conductively connected together. In some implementation, each electrochemical cell of a battery pack may include a conductive sleeve comprised of four conductive strips that are separated from the electrochemical cell by a thin insulating layer of material. In this way, the conductive sleeve provides a return path for electrical current that minimizes the loop area between the electrochemical cell and the conductive sleeve thereof. In some implementations, a battery pack may comprise more than six cylindrical-steel electrochemical cells or less than six cylindrical-steel electrochemical cells conductively connected together.

In some implementations, the electrochemical cells of a battery pack may be conductively connected to form any series and/or parallel arrangement suitable to the number of electrochemical cells being used as part of the battery pack and/or the needs of the device being powered thereby.

In some implementations, the four conductive strips of a conductive sleeve may be equally spaced 90 degrees apart and/or positioned longitudinally on a cylindrical-steel electrochemical cell, separated therefrom by the insulating layer of material. This is the most effective way to minimize (or eliminate) any magnetic field generated by a cylindrical-steel electrochemical cell and/or the battery pack as a whole.

In some implementations, the four conductive strips of the conductive sleeve may not be equally spaced apart. In some implementations, each conductive strip may be made of copper. In some implementations, each conductive strip may be longer than an electrochemical cell. In some implementations, each conductive strip may be positioned on an electrochemical cell so that a first end and a second end thereof overhang the positive terminal and the negative terminal, respectively. In this way, the first end and the second end of each conductive strip may be folded over to make conductive contact with the first end and the second end, respectively, of the other conductive strips positioned on a single electrochemical cell.

In some implementations, the thin insulting layer of material may be positioned between the conductive sleeve and the exterior of each cylindrical-steel electrochemical cell to prevent short circuits. In some implementations, an insulating layer of material may be shaped to match the profile (e.g., width and length) of each conductive strip and be positioned thereunder. In some implementations, an insulating layer of material may be fabricated from polyimide tape.

In some implementations, when two or more electrochemical cells are positioned side-by-side, each electrochemical cell may be positioned (i.e., oriented) so that the conductive strips of its conductive sleeve do not make conductive contact with the conductive strips of the conductive sleeve of an adjacent electrochemical cell.

In some implementations, the battery pack may be configured to provide a supply path and a return path for the flow of current being used to operate a connected device. In some implementations, the supply path and the return path may be placed into a coaxial arrangement in which only a thin layer of insulating material is positioned therebetween. In some implementations, the supply path and the return path of a battery pack may be electrically insulated from each other by the insulating material positioned therebetween. In this way, a short circuit between the supply path and the return path is prevented. In some implementations, each portion of insulating material used to insulate the return path from the supply path may be polyimide tape.

In another implementation, the battery pack with reduced magnetic field emission may further comprise a first circuit board and a second circuit board that are configured to conductively connect one or more cylindrical-steel electrochemical cells. As a result of the geometric precision afforded by the PCB manufacturing process, the loop area between the supply path and the return path may be minimized and the magnetic field generated by the battery pack reduced thereby.

In some implementations, the first end and the second end of each conductive sleeve positioned about an electrochemical cell is conductively connected to the first circuit board and the second circuit board. In some implementations, when the battery pack is assembled, the positive terminal and the negative terminal of each electrochemical cell may be in conductive contact with either the first circuit board or the second circuit board.

In some implementations, each circuit board may be comprised of at least two (2) layers of copper separated by a fiberglass substrate. In some implementations, the two layers of copper may be configured so that the supply path and the return path are positioned directly on top of each other, only separated by a thin layer of insulation (e.g., a coplanar arrangement). In this way, the battery pack may be configured to minimize (or eliminate) any magnetic field generated thereby during use.

In yet another implementation, two or more electrochemical cells of a battery pack with reduced magnetic field emission may be positioned in a coaxial configuration. In this coaxial configuration, the supply path is through the center of each electrochemical cell and the return path is through the conductive sleeve positioned about each electrochemical cell to the negative terminal of the first electrochemical cell. In this way, the supply path and the return path are as close as is physically possible thereby minimizing any magnetic field generated between the conductors (i.e., between the electrochemical cells and their conductive sleeves.

In some implementations, a conductive sleeve may comprise a hollow cylinder configured to fit about the exterior of a first cylindrical-steel electrochemical cell and be conductively connected on at least one end to another conductive sleeve positioned about a second cylindrical-steel electrochemical cell.

DETAILED DESCRIPTION

Figure 1A:
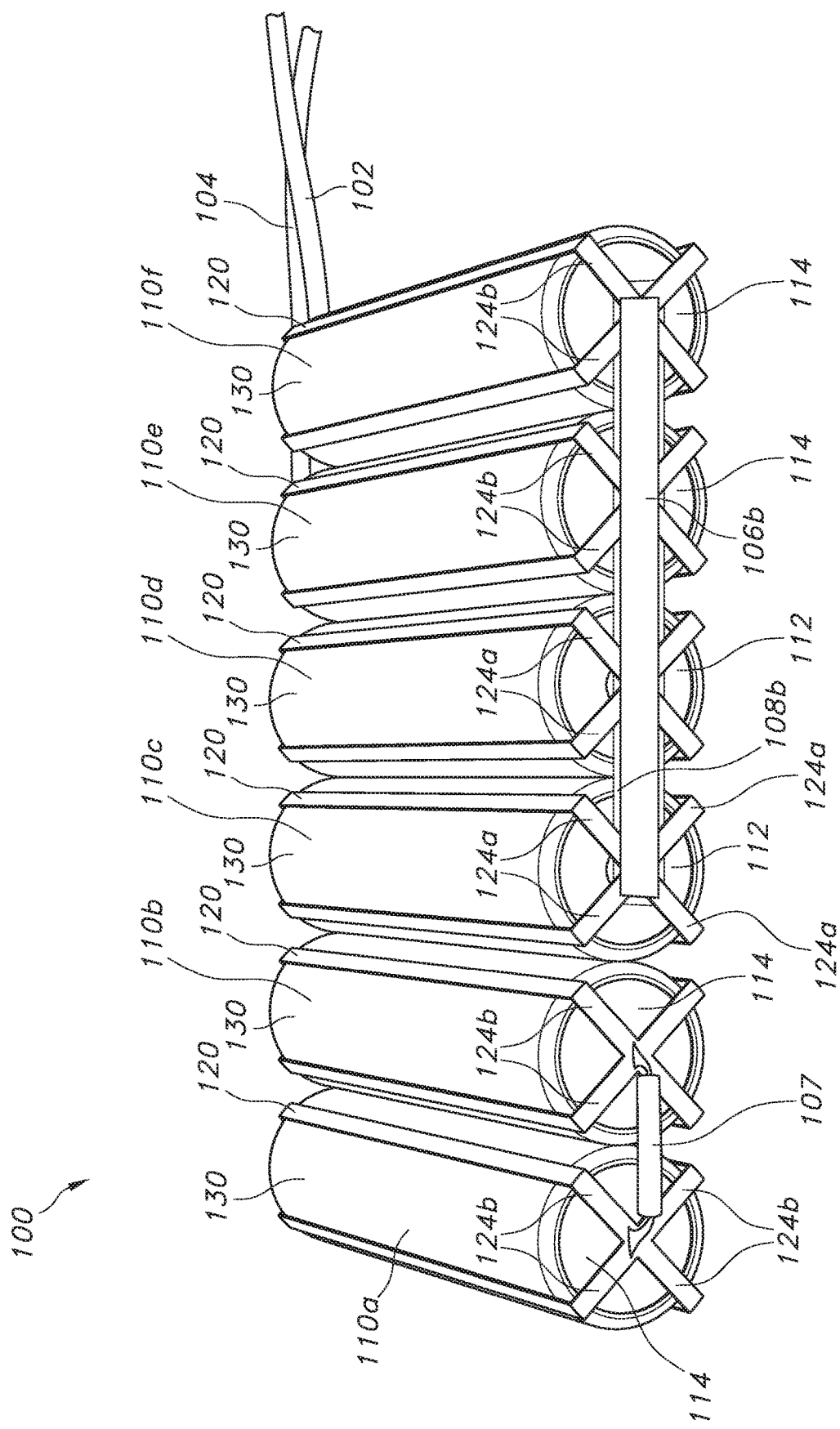
FIG. 1A illustrates a top, front perspective view of an example battery pack with reduced magnetic field emission according to the principles of the present disclosure.
Figure 1B:
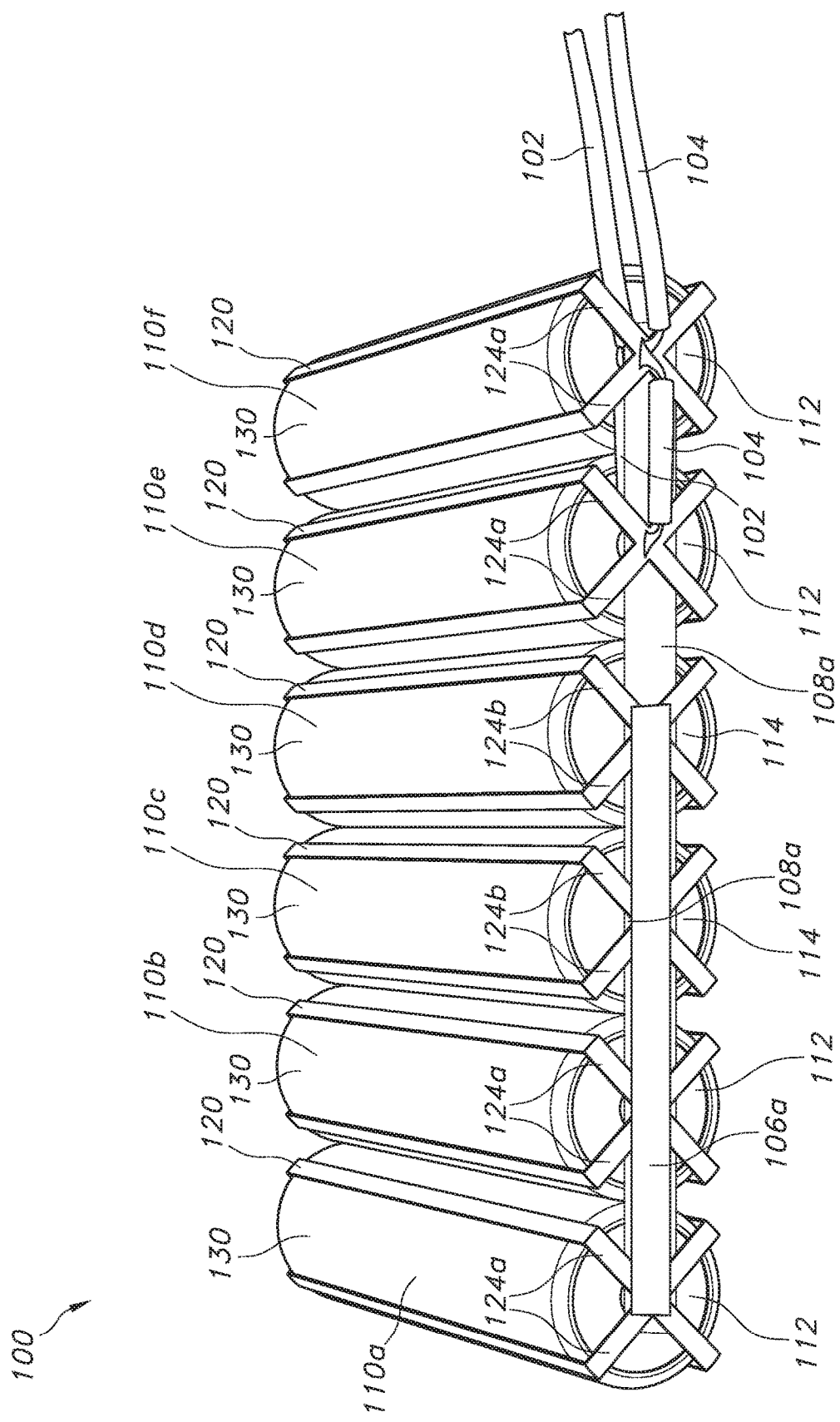
FIG. 1B illustrates a bottom, back perspective view of the battery pack with reduced magnetic field emission shown in FIG. 1A.
Figure 1C:
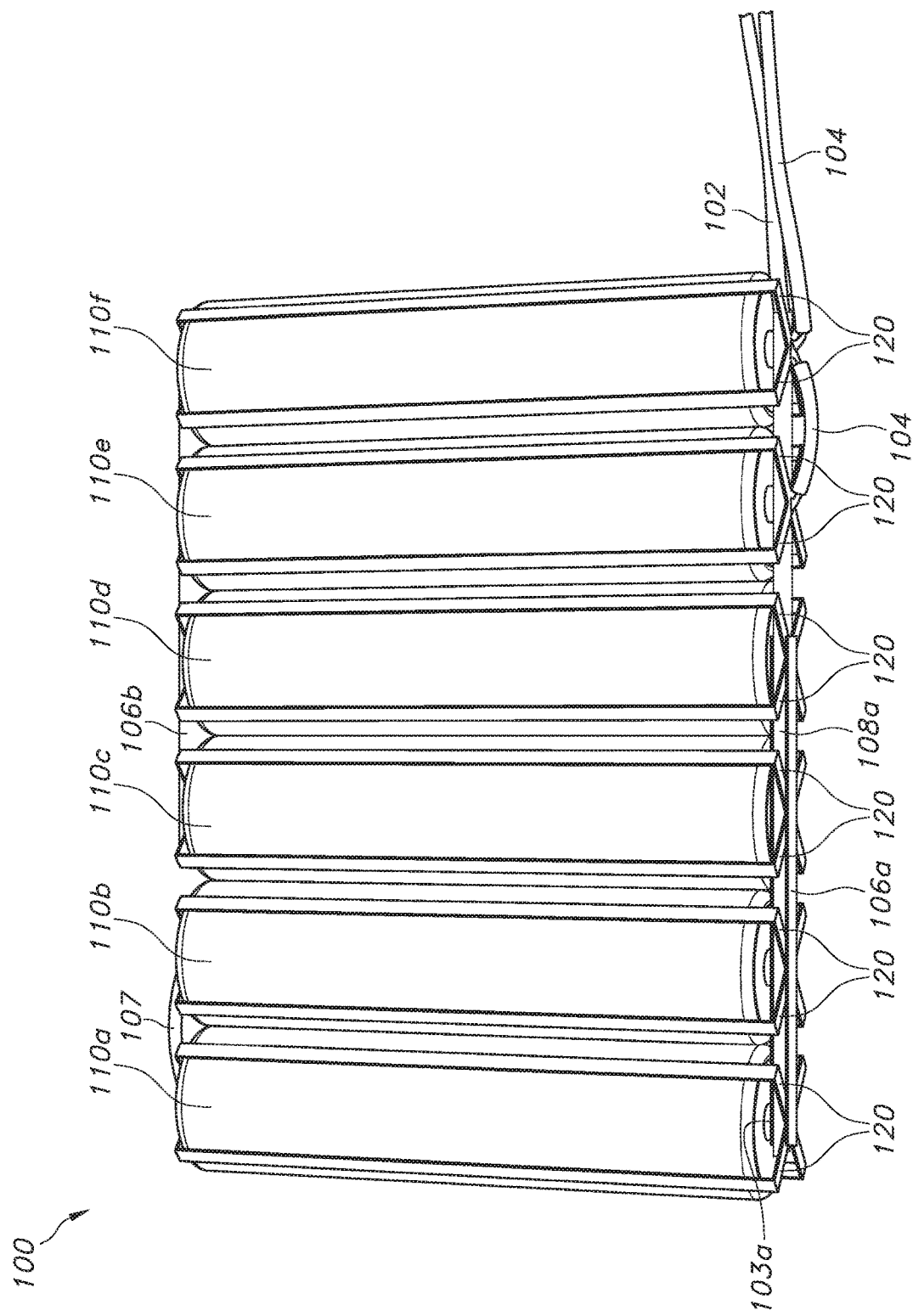
FIG. 1C illustrates a top perspective view of the battery pack with reduced magnetic field emission shown in FIG. 1A.

FIGS. 1A-1C illustrate an example battery pack with reduced magnetic field emission 100 according to the principles of the present disclosure. In some implementations, the battery pack 100 may be configured to reduce and/or eliminate the magnetic field normally generated while electrical current is being drawn from one or more cylindrical-steel electrochemical cells (e.g., AA batteries) by a connected electrical device. In some implementations, the magnetic field generated by the battery pack 100 may be reduced by minimizing or eliminating the loop area of the electrical conductors (e.g., wires or other conductive elements) used to complete the supply path and the return path thereof. In some implementations, the supply path and the return path of a battery pack 100 may be placed into a coaxial arrangement in which only a thin layer of insulating material is positioned therebetween. In this way, the loop area of the electrical conductors is minimized.

As shown in FIGS. 1A-1C, in some implementations, a battery pack 100 may be comprised of six cylindrical-steel electrochemical cells 110 (or batteries) conductively connected together. In some implementation, each electrochemical cell 110 of a battery pack 100 may include a conductive sleeve 120 comprised of four conductive strips 122 that are separated from the electrochemical cell 110 by a thin insulating layer of material 130. In some implementations, the conductive sleeve 120 on each electrochemical cell 110 may be configured to provide a return path for electrical current that minimizes the loop area between the electrochemical cell 110 and the electrical conductor(s) (i.e., the conductive sleeve 120) used to complete the return path of each electrochemical cell 110 used as part of a battery pack 100. In some implementations, a battery pack 100 may comprise more than six cylindrical-steel electrochemical cells 110 or less than six cylindrical-steel electrochemical cells 110 conductively connected together.

As shown in FIGS. 1A-1C, in some implementations, the six electrochemical cells 110 of a battery pack 100 may be conductively connected in series by parallel pairs of electrochemical cells 110 (i.e., a 3S2P configuration). In some implementations, the six electrochemical cells 110 of a battery pack 100 may be conductively connected in series (i.e., a 6S configuration). In some implementations, the six electrochemical cells 110 of a battery pack 100 may be conductively connected in series by parallel triplets (i.e., a 2S3P configuration). In some implementations, the electrochemical cells 110 of a battery pack 100 may be conductively connected to form any series and/or parallel arrangement suitable to the number of electrochemical cells 110 being used as part of the battery pack 100 and/or the needs of the device being powered thereby.

Figure 2:
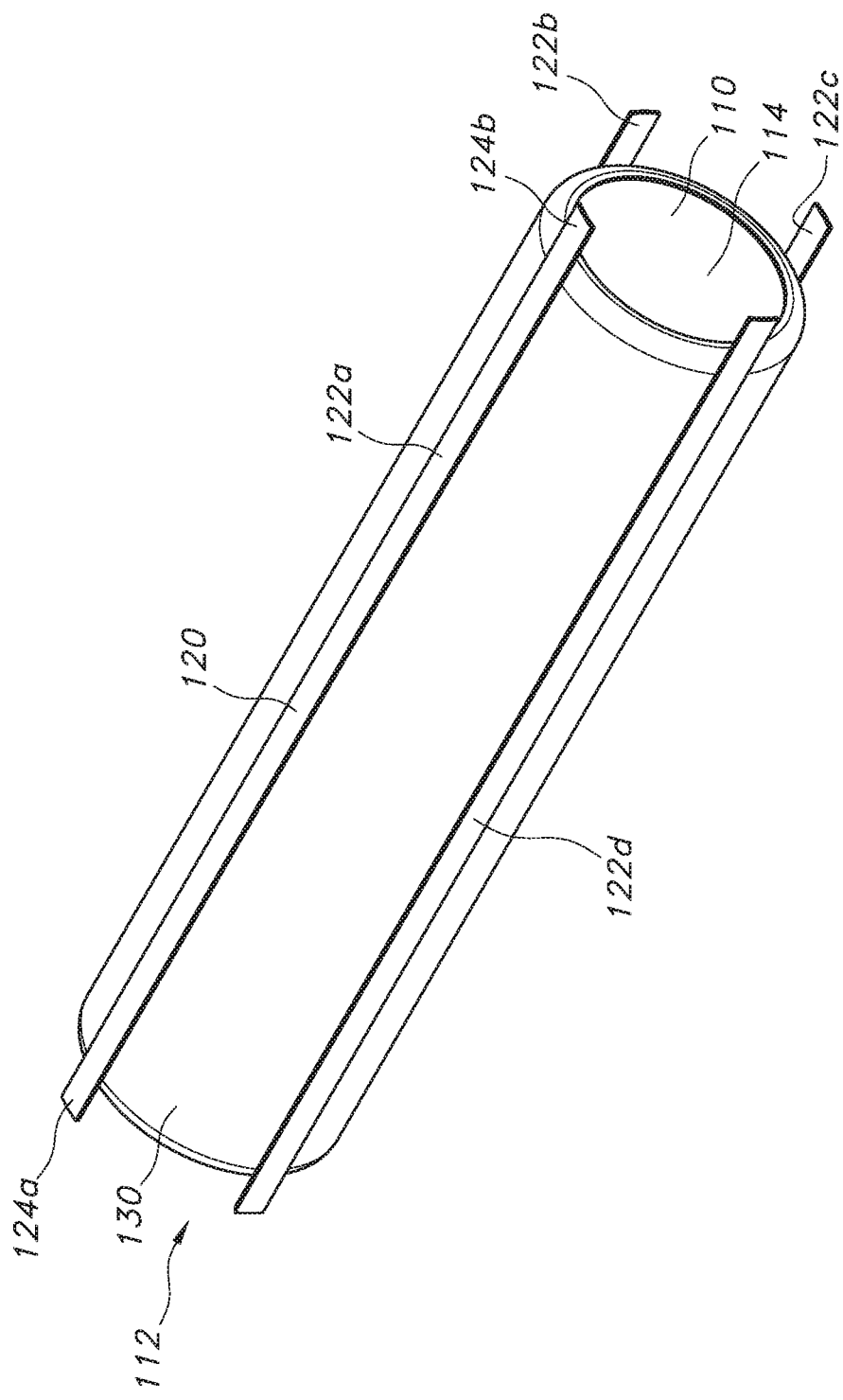
FIG. 2 illustrates an isometric view of a cylindrical-steel electrochemical cell having a conductive sleeve thereon that is separated therefrom by an insulating layer of material according to the principles of the present disclosure.

As shown in FIG. 2, in some implementations, the four conductive strips 122a, 122b, 122c, 122d (collectively 122) of a conductive sleeve 120 may be equally spaced 90 degrees apart and/or positioned longitudinally on a cylindrical-steel electrochemical cell 110, separated therefrom by the insulating layer of material. This is the most effective way to minimize any magnetic field generated by an electrochemical cell 110 and/or the battery pack 100 as a whole. In some implementations, the four conductive strips 122 of the conductive sleeve 120 may not be equally spaced apart (not shown).

As shown in FIG. 2, in some implementations, each conductive strip 122 may be longer than an electrochemical cell 110. In some implementations, each conductive strip 122 (e.g., element 122a) may be positioned on an electrochemical cell 110 so that a first end 124a and a second end 124b thereof overhang the positive terminal 112 and the negative terminal 114, respectively (see, e.g., FIG. 2). In this way, the first end 124a and the second end 124b of each conductive strip (e.g., 122a, 122b, 122c, 122d) may be folded over to make conductive contact with the first end 124a and the second end 124b, respectively, of the other conductive strips 122 positioned on a single electrochemical cell 110 (see, e.g., FIG. 1A). In some implementations, the conductive strips 122 may be flat (see, e.g., FIG. 2). In some implementations, the conductive strips 122 may be round (not shown).

In some implementations, each conductive strip 122 may be made of copper. In some implementations, each conductive strip 122 may be a length of copper foil tape. In some implementations, each of the conductive strips 122 may be made of any conductive material suitable for managing the discharge current requirements associated with the device to be powered by the battery pack 100. In some implementations, each of the conductive strips 122 may be made of any conductive material suitable for use as part of a battery pack with reduced magnetic field emission 100.

As shown in FIG. 2, in some implementations, the insulting layer of material 130 may be positioned between the conductive sleeve 120 and the exterior of each cylindrical-steel electrochemical cell 110 to prevent short circuits. In some implementations, an insulating layer of material 130 may be shaped to match the profile (e.g., width and length) of each conductive strip 122a, 122b, 122c, 122d and be positioned thereunder. In some implementations, an insulating layer of material 130 is no thicker than is required to prevent a short circuit between the conductive sleeve 120 and the cylindrical-steel electrochemical cell 110 on which it is positioned. In some implementations, each insulating layer of material 130 may be fabricated from polyimide tape. In some implementations, any insulating material suitable for use with a battery pack with reduced magnetic field emission 100 may be positioned between the conductive strips 122 and the exterior of each cylindrical-steel electrochemical cell 110.

As shown in FIGS. 1A-1C and 2, in some implementations, due to the arrangement of the conductive strips 122a, 122b, 122c, 122d on each electrochemical cell 110, two or more electrochemical cells 110 may be positioned side-by-side so that the conductive strips 122 positioned on each electrochemical cell 110 reside in the gap(s) naturally formed between two cylindrical objects positioned side-by-side. In this way, two or more electrochemical cells 110 may be positioned side-by-side without conductive contact occurring between their respective conductive sleeves 120.

As shown in FIGS. 1A-1C, in some implementations, the battery pack 100 may be configured to provide a supply path and a return path for the flow of current being used to operate a connected electrical device. In some implementations, the supply path and the return path may be placed into a coaxial arrangement in which only a thin layer of insulating material is positioned therebetween.

In some implementations, the following steps may be used to assemble a battery pack 100 constructed in accordance with the present disclosure.

Initially, to complete the supply path for current flow through the battery pack 100, in some implementations, the positive terminals 112 of the first and second electrochemical cells 110a, 110b may be connected to the negative terminals 114 of the third and fourth electrochemical cells 110c, 110d by a conductive strip of material 103a (see, e.g., FIG. 1C). In some implementations, a first portion of insulating material 108a may be positioned to cover the conductive strip of material 103a conductively connecting the positive terminals 112 of the first and second electrochemical cells 110a, 110b to the negative terminals 114 of the third and fourth electrochemical cells 110c, 110d (see, e.g., FIG. 1B).

Then, in some implementations, the positive terminals 112 of the third and fourth electrochemical cells 110c, 110d may be conductively connected to the negative terminals 114 of the fifth and sixth electrochemical cells 110e, 110f by a conductive strip of material. In some implementations, a second portion of insulating material 108b may be positioned to cover the conductive strip of material conductively connecting the positive terminals 112 of the third and fourth electrochemical cells 110c, 110d to the negative terminals 114 of the fifth and sixth electrochemical cells 110e, 110f (see, e.g., FIG. 1A).

Next, in some implementations, a supply path wire 102 or other conductive element may be conductively connected to the positive terminals 112 of the fifth and sixth electrochemical cells 110e, 110f (see, e.g., FIG. 1B). In some implementations, the first portion of insulating material 108a may extend to cover the junction between the positive terminals 112 of the fifth and sixth electrochemical cells 110e, 110f and the supply path wire 102 (see, e.g., FIG. 1B).

Then, to complete the coaxial return path for current flow through the battery pack 100, in some implementations, the second end 124b of each conductive strip 122 positioned on the first electrochemical cell 110a may be conductively joined together and/or to the negative terminal 114 thereof (see, e.g., FIG. 1A). In some implementations, the second end 124b of each conductive strip 122 positioned on the second electrochemical cell 110b may be conductively joined together and/or to the negative terminal 114 thereof (see, e.g., FIG. 1A). In some implementations, a wire 107 may be used to conductively connect the negative terminals 114 of the first and second electrochemical cells 110a, 110b (see, e.g., FIG. 1A).

Next, in some implementations, the first end 124a of the conductive sleeve 120 positioned about the first and second electrochemical cells 110a, 110b may be conductively connected to the second end 124b of the conducive sleeve 120 positioned about the third and fourth electrochemical cells 110c, 110d by a conductive strip of material 106a (see, e.g., FIG. 1B).

Then, in some implementations, the first end 124a of the conductive sleeve 120 positioned about the third and fourth electrochemical cells 110c, 110d may be conductively connected to the second end 124b of the conducive sleeve 120 positioned about the fifth and sixth electrochemical cells 110e, 110f by a conductive strip of material 106b (see, e.g., FIG. 1A).

Next, in some implementations, the first end 124a of the conductive sleeve 120 positioned about the fifth and sixth electrochemical cells 110e, 110f may be conductively connected together and/or to a return path wire 104 (see, e.g., FIG. 1B).

In this way, a battery pack with reduced magnetic field emission 100 may be assembled.

In some implementations, the magnetic field generated by the battery pack 100 is reduced because the loop area between the electrical conductors (e.g., the wires, the electrochemical cells, and/or the conductive sleeves) used to complete the supply path and the return path has been minimized.

In some implementations, as those of ordinary skill in the art would understand, a battery pack 100 comprised of more than six or less than six electrochemical cells 110 may be assembled using the same or similar techniques.

As shown in FIGS. 1A-1C, in some implementations, it is important that the return paths on parallel electrochemical cells 110 (e.g., cells 110a and 110b, cells 110c and 110d, and/or cells 110e and 110f) be geometrically and electrically identical, otherwise the return current will flow along the path of least resistance creating an imbalance in return path current flow. This imbalance may generate stray magnetic fields because the coupling between the supply path and the return path is no longer optimized, resulting in an increase in effective loop area.

In some implementations, the supply path and the return path of a battery pack 100 are electrically insulated from each other by insulating material positioned therebetween. In this way, a short circuit between the supply path and the return path is prevented.

In some implementations, each portion of insulating material 130, 108a, 108b used to insulate the return path from the supply path may be polyimide tape. In some implementations, each portion of insulating material 130, 108a, 108b used to insulate the return path from the supply path may be any material suitable for preventing a short circuit between the supply path and the return path of a battery pack 100.

Figure 3:
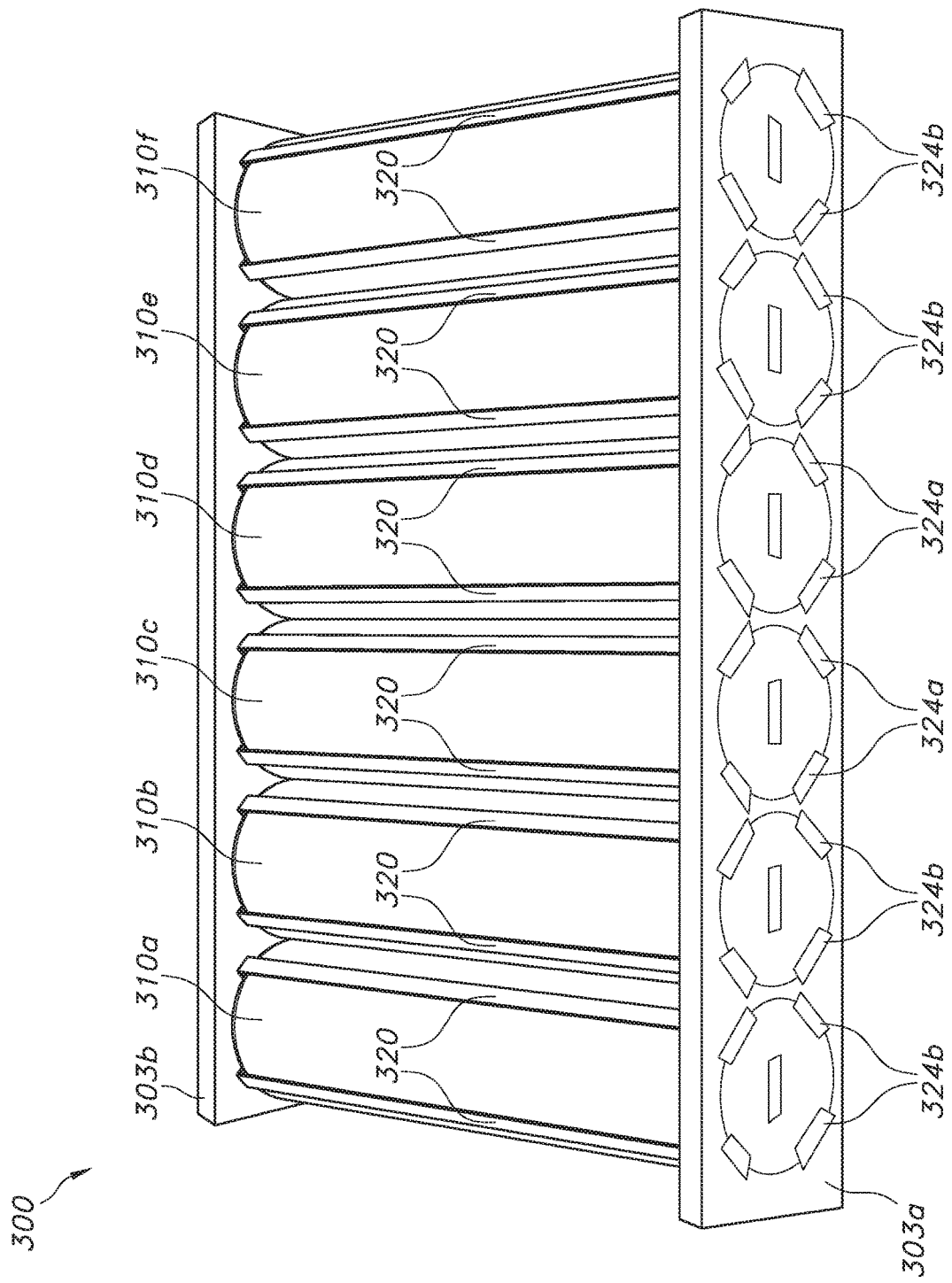
FIG. 3 illustrates a top, front perspective view of another example battery pack with reduced magnetic field emission according to the principles of the present disclosure.

FIG. 3 illustrates another example implementation of a battery pack with reduced magnetic field emission 300 in accordance with the present disclosure. In some implementations, the battery pack with reduced magnetic field emission 300 is similar to the battery pack with reduced magnetic field emission 100 discussed above but includes a first circuit board 303a and a second circuit board 303b that are configured to conductively connect one or more cylindrical-steel electrochemical cells 310. As a result of the geometric precision afforded by the PCB manufacturing process, the loop area between the supply path and the return path may be minimized and the magnetic field generated by the battery pack 300 reduced thereby.

In some implementations, the circuit boards 303a, 303b may be designed to have the same, or similar, conductor and/or insulator geometries as those shown and described in connection with the battery pack 100 discussed above.

As shown in FIG. 3, in some implementations, the first end 324a and the second end 324b of each conductive sleeve 320 positioned about an electrochemical cell 310 may be conductively connected to either the first circuit board 303a or the second circuit board 303b. In some implementations, when the battery pack 300 is assembled, the positive terminal and the negative terminal of each electrochemical cell 310 may be in conductive contact with either the first circuit board 303a or the second circuit board 303b (see, e.g., FIG. 3).

In some implementations, each circuit board 303a, 303b may be comprised of at least two (2) layers of copper (or other conductive material) separated by a fiberglass substrate (or other dielectric substrate). In some implementations, the two layers of copper may be configured so that the supply path and the return path are positioned directly on top of each other, only separated by a thin layer of insulation (e.g., a coplanar arrangement). In this way, the battery pack 300 may be configured to minimize any magnetic field generated thereby during use. Stated another way, in some implementations, the circuit boards 303 may be configured to reduce magnetic field emission through the use of trace geometry that minimizes the gap, and maximizes the coupling, between the supply path and the return path. In this way, the loop area is minimized and the magnetic field generated by the battery pack 300 is reduced or eliminated. In some implementations, stripline geometry (e.g., a four (4) layer circuit board in conjunction with via fences) could be used to create a coaxial conductor coupling, further increasing coupling, and thereby minimize any magnetic field generated by a battery pack 300.

Figure 4:
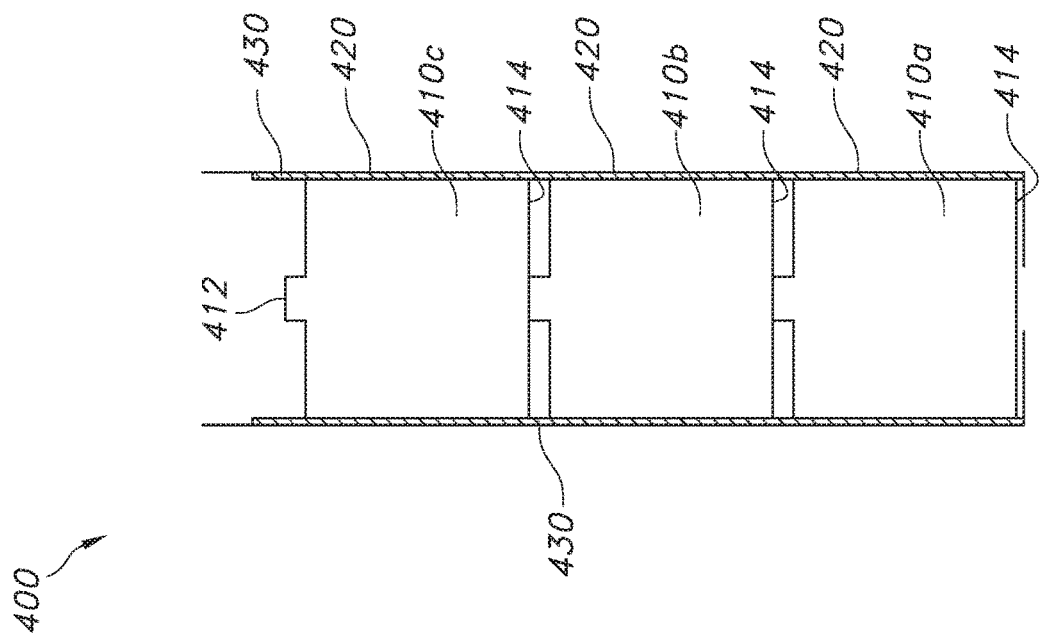
FIG. 4 illustrates a cut-away view of yet another example battery pack with reduced magnetic field emission according to the principles of the present disclosure.

FIG. 4 illustrates yet another example implementation of a battery pack with reduced magnetic field emission 400 in accordance with the present disclosure. In some implementations, the battery pack with reduced magnetic field emission 400 is similar to the battery packs with reduced magnetic field emission 100, 300 discussed above but the electrochemical cells 410a, 410b, 410c are positioned in a coaxial configuration. In this coaxial configuration, the supply path is through the center of each electrochemical cell 410 and the return path is through the conductive sleeve 420 positioned about each electrochemical cell 410 to the negative terminal 414 of the first electrochemical cell 410a. In this way, the supply path and the return path are as close as is physically possible thereby minimizing any magnetic field generated between the conductors (i.e., between the electrochemical cells and their conductive sleeves 420).

As shown in FIG. 4, in some implementations, a thin insulating layer of material 430 may be positioned between the exterior of each electrochemical cell 410 and the conductive sleeve 420 positioned thereabout. In this way, short circuits between the conductive sleeves 420 (return path) and the stacked electrochemical cells 410 may be prevented.

As shown in FIG. 4, in some implementations, the conductive sleeve 420 may comprise a hollow cylinder configured to fit about the exterior of a first cylindrical-steel electrochemical cell 410*a* and be conductively connected on at least one end to another conductive sleeve 420 positioned about a second cylindrical-steel electrochemical cell 410*b*. In some implementations, each conductive sleeve 420 may be constructed the same as, or similar to, the conductive sleeve 120 discussed above.

In some implementations, even in the presence of steel/iron casings used with some electrochemical cells, the coaxial return path of the battery pack 400 may result in very small stray magnetic fields being generated. This allows readily available cylindrical-steel electrochemical cells (e.g., AA batteries, 18650 batteries, etc.) to be used with magnetically sensitive devices (e.g., a magnetometer or compass) in place of more expensive and/or less safe pouch cells.

In some implementations, any permanent magnetic field (a magnetic field that is present when no current is flowing) in the casing of an electrochemical cell 110, 310, 410 may be controlled by positioning mu-metal magnetic shielding between the battery pack 100, 300, 400 and any magnetically sensitive element(s) of the device being powered thereby. In this way, the operation of magnetically sensitive elements (e.g., a magnetometer or other electronic compass) is not disrupted by the battery pack 100, 300, 400. As used herein, a permanent magnetic field refers to any magnetic field resulting from the magnetization of the ferrous casing of an electrochemical cell.

In some implementations, a battery pack with reduced magnetic field emission 100, 300, 400 may be used as a power source for any electrical device that is configured to be powered by cylindrical-steel electrochemical cells. For example, remotely piloted vehicles and unmanned aerial systems/drones, electric cars, etc.

In some implementations, when reducing exposure to magnetic fields(s) is desirable, a battery pack with reduced magnetic field emission 100, 300, 400 may be used to power an electrical device.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A battery pack with reduced magnetic field emission comprising:
   a first cylindrical-steel electrochemical cell that includes a first conductive sleeve,
   the first conductive sleeve is separated from the first cylindrical-steel electrochemical cell by a first insulating layer of material, the first conductive sleeve of the first cylindrical steel electrochemical cell is comprised of four discrete conductive strips, the four conductive strips are positioned longitudinally relative to the first cylindrical-steel electrochemical cell;
   wherein the first conductive sleeve of the first cylindrical-steel electrochemical cell provides a first return path for electrical current being drawn therefrom by a connected electrical device.

2. The battery pack of claim 1, wherein the four discrete conductive strips of the first conductive sleeve are equally spaced 90 degrees apart.

3. The battery pack of claim 2, wherein each of the four discrete conductive strips is a length of copper foil tape.

4. The battery pack of claim 3, wherein the first insulating layer of material is fabricated from polyimide.

5. The battery pack of claim 2, further comprising:
   a second cylindrical-steel electrochemical cell that includes a second conductive sleeve,
   the second conductive sleeve is separated from the second cylindrical-steel electrochemical cell by a second insulating layer of material, the second conductive sleeve is comprised of four discrete conductive strips, the four conductive strips of the second cylindrical-steel electrochemical cell are equally spaced 90 degrees apart and positioned longitudinally relative to the second cylindrical-steel electrochemical cell;
   wherein the second conductive sleeve of the second cylindrical-steel electrochemical cell provides a second return path for electrical current being drawn therefrom by the connected electrical device; and
   wherein the first cylindrical-steel electrochemical cell and the second cylindrical-steel electrochemical cell are positioned side-by-side and oriented so that the first conductive sleeve and the second conductive sleeve do not make conductive contact.

6. The battery pack of claim 5, wherein each of the four discrete conductive strips of each of the first conductive sleeve and the second conductive sleeve is a length of copper foil tape.

7. The battery pack of claim 6, wherein the first insulating layer of material positioned between the first cylindrical-steel electrochemical cell and the first conductive sleeve is fabricated from polyimide, and the second insulating layer of material positioned between the second cylindrical-steel electrochemical cell and the second conductive sleeve is fabricated from polyimide.

8. A battery pack with reduced magnetic field emission comprising:
   a first cylindrical-steel electrochemical cell and a first conductive sleeve, the first conductive sleeve is separated from the first cylindrical-steel electrochemical cell by a first insulating layer of material, the first conductive sleeve is comprised of four conductive strips, the four conductive strips of the first conductive sleeve are positioned longitudinally relative to the first cylindrical-steel electrochemical cell;

a second cylindrical-steel electrochemical cell and a second conductive sleeve, the second conductive sleeve is separated from the second cylindrical-steel electrochemical cell by a second insulating layer of material, the second conductive sleeve is comprised of four conductive strips, the four conductive strips of the second conductive sleeve are positioned longitudinally relative to the second cylindrical-steel electrochemical cell; and a first circuit board and a second circuit board, each circuit board is comprised of at least two layers of conductive material separated by a dielectric substrate;

wherein the first cylindrical-steel electrochemical cell and the second cylindrical-steel electrochemical cell are in conductive contact with the first circuit board and the second circuit board;

wherein the first conductive sleeve and the second conductive sleeve are is conductively connected to the first circuit board and the second circuit board; and wherein the first conductive sleeve and the second conductive sleeve provide a return path for electrical current being drawn from the first cylindrical-steel electrochemical cell and the second cylindrical-steel electrochemical cell by a connected electrical device.

9. The battery pack of claim 8, wherein the four conductive strips of each of the first conductive sleeve and the second conductive sleeve are equally spaced 90 degrees apart.

10. The battery pack of claim 9, wherein each of the four conductive strips of each of the first conductive sleeve and the second conductive sleeve is a length of copper foil tape.

11. The battery pack of claim 10, wherein the first insulating layer of material positioned between the first cylindrical-steel electrochemical cell and the first conductive sleeve is fabricated from polyimide, and the second insulating layer of material positioned between the second cylindrical-steel electrochemical cell and the second conductive sleeve is fabricated from polyimide.

12. The battery pack of claim 9, wherein the first cylindrical-steel electrochemical cell and the second cylindrical-steel electrochemical cell are positioned side-by-side and oriented so that the first conductive sleeve does not make conductive contact with the second conductive sleeve.

\* \* \* \* \*